United States Patent [19]

Krude

[11] 4,300,651
[45] Nov. 17, 1981

[54] VEHICLE WHEEL MOUNTING AND DRIVING ASSEMBLY INCLUDING CONSTANT VELOCITY UNIVERSAL JOINT

[75] Inventor: Wernez Krude, Neunkirchen, Fed. Rep. of Germany

[73] Assignee: Uni-Cardan AG, Siegburg, Fed. Rep. of Germany

[21] Appl. No.: 112,193

[22] Filed: Jan. 15, 1980

[30] Foreign Application Priority Data

Jan. 29, 1979 [DE] Fed. Rep. of Germany ....... 2903231

[51] Int. Cl.³ .......................................... B60K 17/30
[52] U.S. Cl. ......................................... 180/256; 64/8; 64/21; 74/713; 180/70 R
[58] Field of Search .............. 180/253, 254, 256, 257, 180/258, 259, 263, 73 R, 73 D, 73 C, 71, 70 R; 301/60, 109; 308/190, 191; 74/713; 64/8, 21, 22

[56] References Cited

U.S. PATENT DOCUMENTS

| | | | |
|---|---|---|---|
| 3,028,924 | 4/1962 | Cooper | 64/8 |
| 4,068,499 | 1/1978 | Sharp | 64/21 |
| 4,090,751 | 5/1978 | Krude | 308/191 |

FOREIGN PATENT DOCUMENTS

| | | | |
|---|---|---|---|
| 378018 | 7/1932 | United Kingdom | 180/263 |
| 1213931 | 11/1970 | United Kingdom | |

Primary Examiner—Joseph F. Peters, Jr.
Assistant Examiner—Randall A. Schrecengost
Attorney, Agent, or Firm—Toren, McGeady & Stanger

[57] ABSTRACT

In a vehicle wheel mounting and driving assembly, power from a vehicle drive unit is transmitted through a differential gear system to a first universal joint assembly and then to a second universal joint assembly mounted in the wheel of the vehicle. The wheel hub is formed with an inner bearing ring which has a diameter greater than the outer diameter of the outer joint member of the first universal joint assembly of the differential gear system. The vehicle wheel is formed with a central bore having a diameter which is greater than the outer diameter of the outer joint member of the second universal joint assembly of the wheel. The first universal joint assembly is connected to the differential gear system with its outer joint member axially affixed to the differential gear system by a radially expandable spring ring and with longitudinal gear teeth on a trunnion of the outer joint member, thereby enabling the first universal joint assembly to be axially removed from the differential gear system, while also being in rotative driving engagement therewith. As a result, disassembly of the entire mechanism may be readily accomplished from the exterior of the vehicle wheel without requiring dismounting of the wheel from the vehicle.

4 Claims, 3 Drawing Figures

VEHICLE WHEEL MOUNTING AND DRIVING ASSEMBLY INCLUDING CONSTANT VELOCITY UNIVERSAL JOINT

The present invention relates generally to mounting and driving apparatus for the wheel of a motor vehicle and more particularly to a wheel mounting and driving assembly wherein the wheel is driven by the drive unit of the vehicle through a differential gear system and through a first and a second universal joint assembly, the second universal joint assembly comprising a constant velocity universal joint.

In wheel bearing arrangements of the type to which the present invention relates, the differential gear system is directly connected with a first universal joint assembly adjacent the differential gear system and a second constant velocity universal joint assembly connected to the wheel is connected in driving engagement with the first universal joint assembly. An outer bearing ring having the wheel supported thereon is provided and a wheel hub and an inner bearing ring of the wheel are connected with the outer joint member of the second or constant velocity universal joint assembly. A bore defined by the inner bearing ring of the wheel receives in nonrotative engagement therewith the outer circumference of the outer joint member of the second universal joint assembly. The first universal joint assembly includes an outer joint member which is connected to be rotatably driven by the drive means of the vehicle.

In prior art bearing arrangements of this type, known for example from U.S. Pat. No. 4,090,751, the inner bearing ring normally includes a through opening having a cross section dimensioned in such a way that the outer joint member of the constant velocity universal joint on wheel, and the entire universal joint shaft, may be inserted into the inner bearing ring from the side of the wheel hub. However, in this type of arrangement, it is still necessary to raise the vehicle by utilization of a jack or similar means and to disassemble the vehicle wheel. The entire universal joint shaft may be disassembled by passing it through the wheel hub, but this will only be enabled after detaching the sliding joint on the side of the gear assembly after the vehicle wheel has been removed.

Another prior art construction is known from British Pat. No. 1,213,931, wherein the sliding constant velocity universal joint on the side of the gear assembly is a direct component part of the differential gear assembly. In this case, the disassembly of the universal joint shaft requires that the constant velocity universal joint be disassembled directly in the gear assembly in order to facilitate the disassembly through the bearing arrangement.

It is therefore the aim of the present invention to provide a construction for a wheel bearing arrangement of the type previously mentioned wherein the universal joint shaft may be easily assembled and disassembled without requiring the performance of work on the joint of the gear system and wherein it is, moreover, unnecessary to remove the vehicle wheel for these purposes.

SUMMARY OF THE INVENTION

Briefly, in accordance with the present invention, the wheel mounting and driving assembly of the type previously described is constructed so that the vehicle wheel will have a central bore having a diameter $D_R$ which is larger than the outer diameter $D_1$ of the outer joint member of the second or constant velocity universal joint assembly. Further in accordance with the invention, the bore defined by the inner bearing ring of the wheel is formed with a diameter $D_2$ which is larger than the outer diameter $D_3$ of the outer joint member of the first universal joint assembly mounted adjacent the differential gear system. Furthermore, the arrangement of the invention is constructed so that the differential gear system is connected with the drive means of the vehicle by a connection which is constructed as a plug connection.

By means of the arrangement according to the present invention, it is possible to readily assemble and disassemble the wheel mounting and driving mechanism within a relatively short period of time and it is also possible within a short time to replace parts which are subjected to wear. Disassembly of the universal joint shaft is performed without requiring that the vehicle be raised by means of a jack or the like and this disassembly may be performed directly through the central bore of a vehicle wheel which is formed with an appropriate size, in accordance with the concepts of the invention. By means of a pulling device, the universal joint shaft may be pulled from the outside i.e., from the exterior side of the wheel, because it is merely necessary to overcome axial fixing of the connection between the joint of the gear system and the drive unit by applying an appropriately adequate pulling force.

In accordance with another essential feature of the invention, the outer joint member is formed with a trunnion provided with longitudinally extending gear teeth and having a locking ring on its outer circumference in order to provide axial fixing.

It is an advantageous feature of this embodiment that torque is safely transmitted by means of the longitudinal gear teeth, with the axial locking of the trunnion of the outer joint member being ensured by a locking ring received in a groove.

Furthermore, a wire spring ring is provided as the locking ring. Such a wire spring ring is received in a corresponding groove and it may be compressed by radially acting component forces when an axial pulling force is applied, so that the ring may recede into the groove constructed with the appropriate size. As a result, the joint may be readily removed from the bore provided in the differential gear assembly.

Moreover, the sliding joint of the gear system is secured against axial disassembly.

Sliding joints of the differential gear system which themselves facilitate axial assembly of the joints must be secured against disassembly since, otherwise, when an appropriate pulling force is applied, instead of the outer joint member being removed from the differential system, the joint itself will be disassembled.

In order to exclude the outer bearing ring from torque transmission operation, it is provided in accordance with another essential feature of the invention that the intermediate flange of the brake disc is directly, non-rotatably connected to the outer joint member through gear teeth.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

Figure 1:
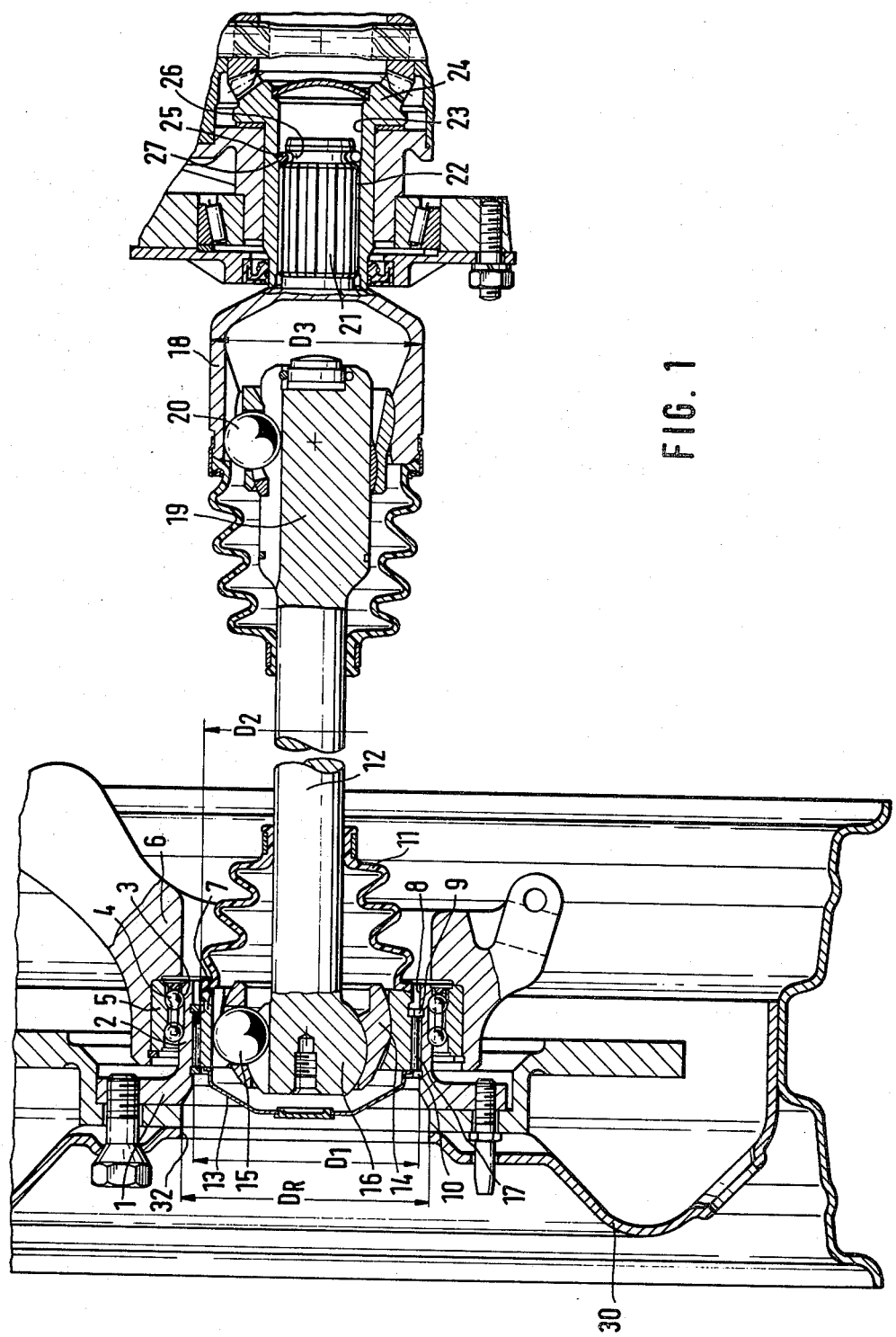
FIG. 1 is a sectional view showing a wheel bearing assembly with an intermediate drive shaft and with a portion of the differential gear system.

Referring to FIG. 1, there is illustrated a wheel bearing assembly for mounting and driving the wheel of a motor vehicle through a constant velocity universal joint. The assembly consists essentially of a wheel hub 1 which is constructed in a single piece with an inner bearing ring 2. On the outer surface of the inner bearing ring 2 grooves 3 are provided for receiving rolling bodies or rollers 4. The wheel bearing is formed by the inner bearing 2, the rollers 4 and an outer ring 5. The outer ring 5 is fastened to a corresponding wheel support (not shown) through a flange 6.

An outer joint member 7 of the constant velocity universal joint which is mounted on wheel is received in a bore 8 of the inner bearing ring 2 and it is axially secured by means of two locking rings 9 and 10. The interior space of the universal joint is sealed, on one side, by bellows 11 which is fixed on the outer surface of the outer joint member 7 and on the intermediate shaft 12 and, on the other side, by a cover 13 which is fastened on the outer joint member 7.

The wheel universal joint assembly includes a cage 14 which operates to guide and support the universal joint, rollers or balls 15 within the cage 14 being arranged in the spherical interior space of the outer joint member 7. The cage 14 is guided with its inner hollow space on the outer surface of an inner joint member 16 and longitudinal gear teeth 17 serve to transmit torque from the outer joint member 7 to the wheel hub 1.

On the end of the intermediate shaft 12 which is located opposite the wheel universal joint, there is arranged a sliding universal joint which operates as the differential gear system universal joint and which also consists of an outer joint member 18, an inner joint member 19 arranged in the hollow space of the outer joint member 18 and balls 20 which are arranged in grooves of the two joint members and which served to transmit torque therebetween.

The outer joint member 18 of the differential gear universal joint assembly is constructed in one piece with a trunnion 21. The trunnion 21 is provided with longitudinal gear teeth 22, by means of which the trunnion is received within a bore 23 of a bevel gear 24 of a differential gear system of the vehicle. The trunnion 21 is held in an axially fixed position in the bore 23 of a differential gear system by means of a locking ring 25.

The locking ring 25 is constructed as a wire spring ring and it is received within a groove 26 of the trunnion 21. The groove 26 is formed with a depth which enables the spring 26 to reseat into this groove during assembly. When the spring ring 25 expands and reaches the locking groove 27, it will fix the outer joint member 18 of the differential gear universal joint axially in place within the differential gear system.

It should be noted that the wheel universal joint assembly shown at the left in FIG. 1 is a rigid joint and that the differential gear universal joint assembly shown at the right of FIG. 1 is a sliding joint. Additionally, it should be noted that the engagement of the trunnion 21 of the outer joint member 18 into the differential gear system essentially constitutes a plug connection by means of which the trunnion 21 may be pulled outwardly of the differential gear system by disengagement of the spring ring 25 from within the locking groove 27.

The vehicle wheel 30 includes a central bore 32 which is formed with a diameter $D_R$ which is larger than an outer diameter $D_1$ of the outer joint member 7, including the longitudinal gear teeth 17. As a result, disassembly of the joint may be readily accomplished. When taking into consideration the longitudinal gear teeth 17, the clear inner diameter $D_2$ of the bore 8 of the inner bearing ring 2, in turn, is larger than the outer diameter $D_3$ of the outer joint member 18 of the universal joint of the differential gear system.

Since $D_R > D_1 \geqq D_2 > D_3$, the entire drive shaft can be assembled and disassembled readily and without difficulty simply by passing it through the vehicle wheel 30.

Figure 2:
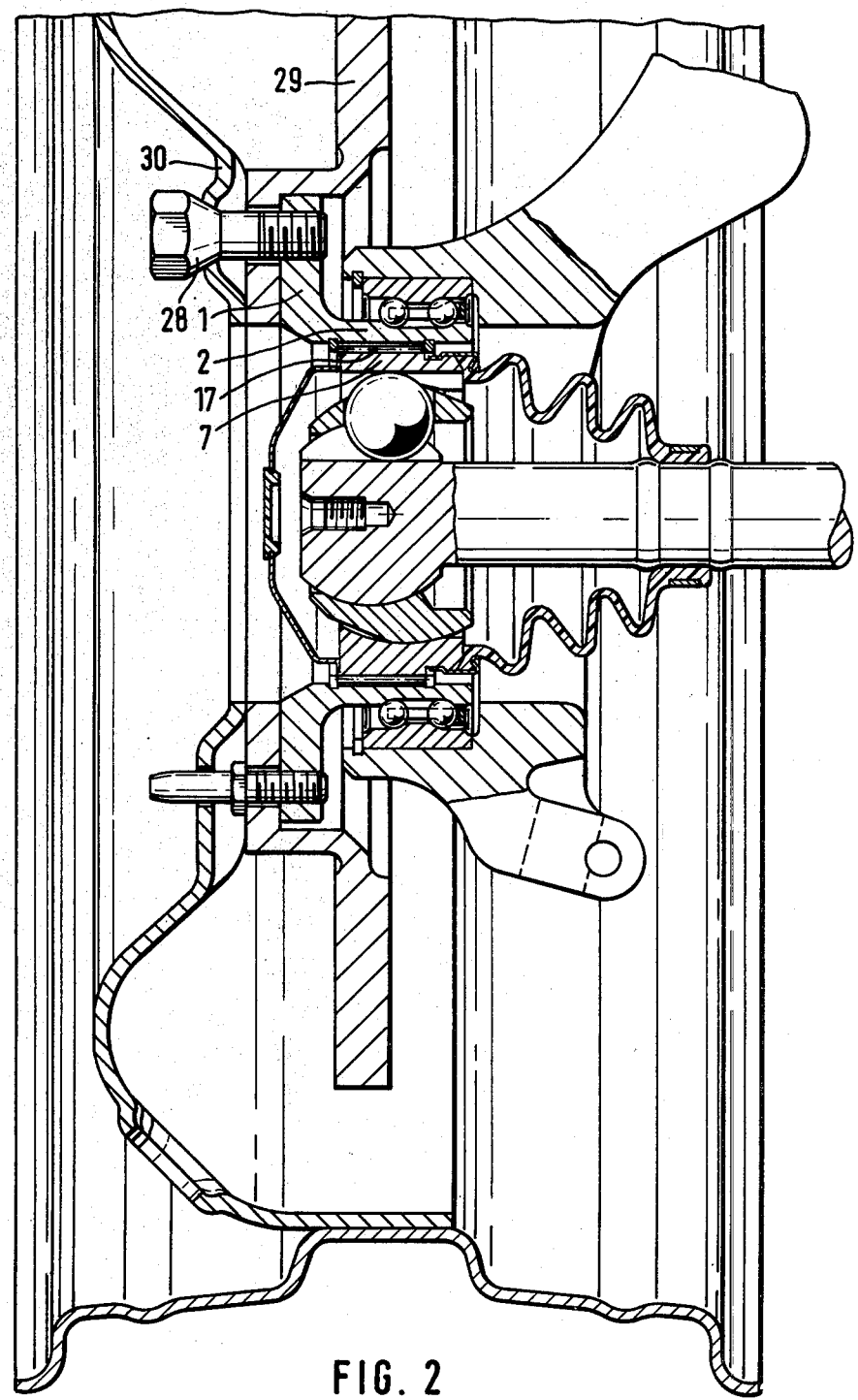
FIG. 2 is a detailed sectional view of the wheel bearing system illustrated in FIG. 1 shown on a larger scale.

In FIG. 2, the wheel bearing is illustrated on an enlarged scale. FIG. 2 shows wheel hub 1 constructed as a unitary piece with the inner bearing ring 2 and the outer joint member 7 which is nonrotatably connected to the wheel hub through the longitudinal gear teeth 17. The wheel hub 1 is nonrotatably connected to the brake disk 29 and the vehicle wheel 30 through the wheel bolts 28.

Figure 3:
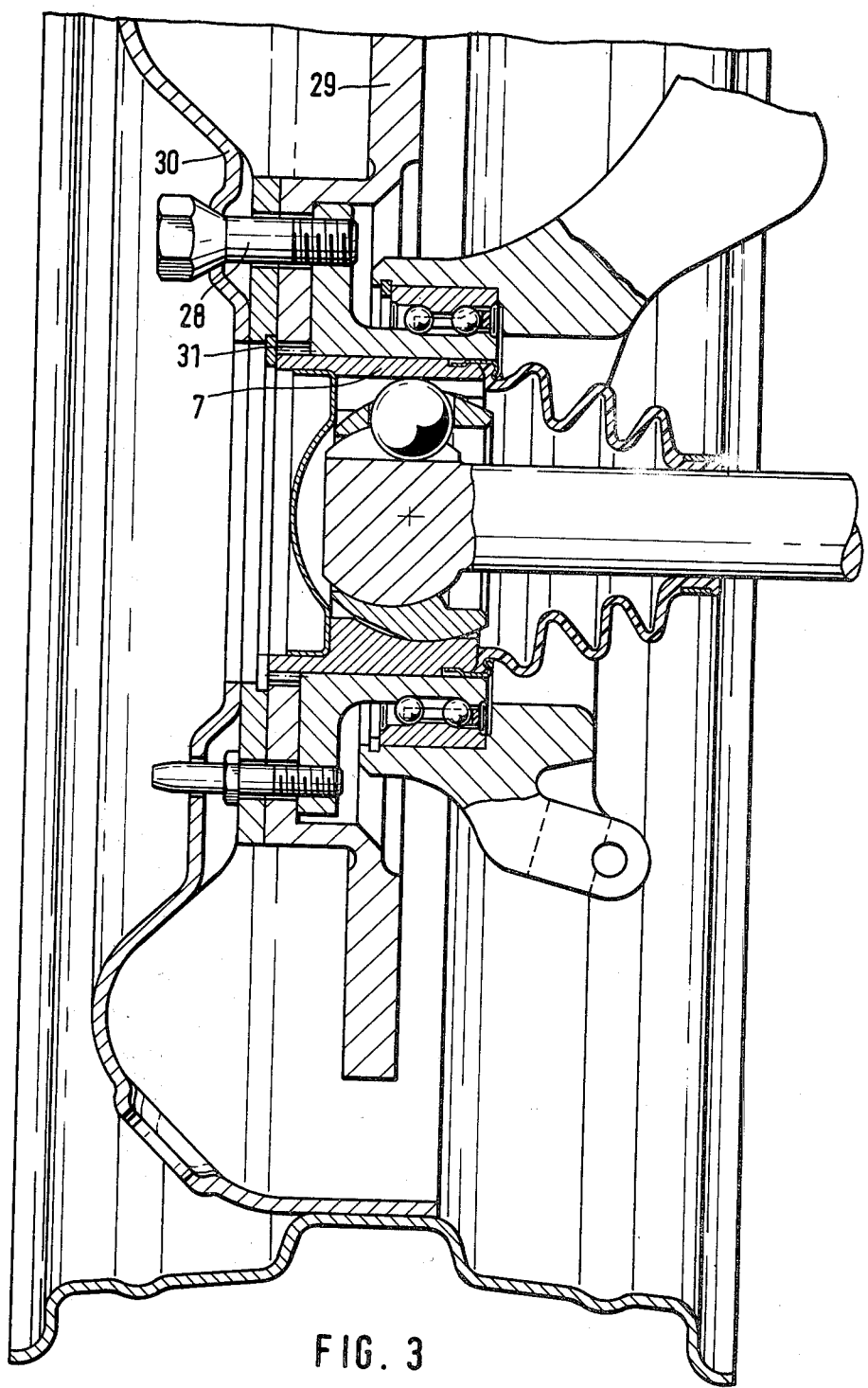
FIG. 3 is a sectional view showing a wheel bearing assembly which is generally and in principle similar to that illustrated in FIG. 2 but which, however, provides a different type of torque transmission.

FIG. 3 relates in principle to a bearing arrangement such as that already illustrated and described in connection with FIG. 2. However, in FIG. 3, the outer joint member 7 is provided with longitudinal gear teeth 31 which cooperate with a corresponding set of gear teeth of the brake disk 29 and which transmit torque to the vehicle wheel 30 through an intermediate flange of the brake disk 29 and the wheel bolts 28.

While specific embodiments of the invention have been shown and described in detail to illustrate the application of the inventive principles, it will be understood that the invention may be embodied otherwise without departing from such principles.

What is claimed is:

1. A wheel mounting and driving assembly for the wheel of a motor vehicle comprising: a differential gear system through which power is delivered from drive means of said vehicle to said wheel; a first universal joint assembly adjacent said differential gear system; plug connection means connecting said first universal joint assembly with said differential gear system to be driven by said drive means of said vehicle, said plug connection means being constructed to enable said first universal joint assembly to be disconnected from said differential gear system by axially withdrawing said first universal joint assembly therefrom in the direction of said wheel; a second universal joint assembly in driven engagement with said first universal joint assembly; a bearing assembly rotatively mounting said wheel on said vehicle including an outer bearing ring supported on said vehicle and an inner bearing ring affixed with said wheel; said second universal joint assembly including an outer joint member arranged within an inner bore of said inner bearing ring and adapted to be placed in driving engagement therewith to transmit driving power to said wheel; gear teeth means extending in the axial direction of said wheel interconnecting said inner bearing ring and said outer joint member of said second universal joint assembly in direct driving engagement while permitting relative axial displacement therebetween; and releasable locking means axially releasably locking said inner bearing ring and said outer joint member of said second universal joint assembly together; said wheel having a central bore with a diameter $D_R$ which is larger than the outer diameter $D_1$ of said outer joint member of said second universal joint assembly, said inner bore of said inner bearing ring having a diameter $D_2$ which is larger than the outer diameter $D_3$ of the outer joint member of said first universal joint assembly; said mounting and driving assembly being thereby capable of disassembly from the exterior of said wheel.

2. An assembly according to claim 1 wherein said plug connection interconnecting said first universal joint with said differential gear system comprises trunnion means formed on the outer joint of said first universal joint assembly, longitudinal gear teeth means formed on said trunnion means and locking ring means interposed between said trunnion means and said differential gear system for fixing said outer joint member thereto in an axial direction.

3. An assembly according to claim 2 wherein said locking ring means comprise a wire spring ring.

4. An assembly according to claim 1 wherein said first universal joint assembly is constructed so as to be secured against axial disassembly thereof.

* * * * *